Figure 1:
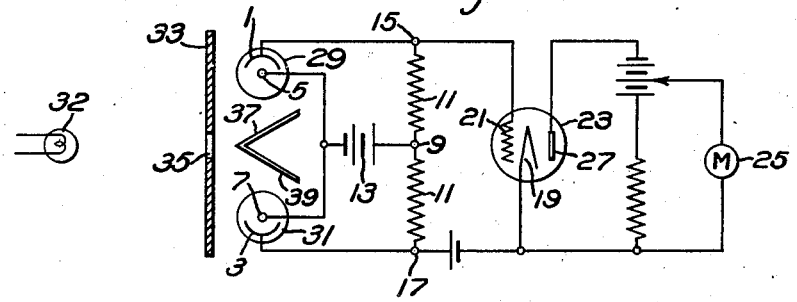

June 19, 1934.  E. D. WILSON  1,963,185
PHOTOTUBES
Filed March 24, 1931

WITNESSES:
R. J. Fitzgerald
Hymen Diamond

INVENTOR
Earl D. Wilson.
BY Wesley G. Carr
ATTORNEY

Patented June 19, 1934

1,963,185

UNITED STATES PATENT OFFICE 1,963,185

PHOTOTUBE

Earl D. Wilson, Wilkinsburgh, Pa., assignor to Westinghouse Electric & Manufacturing Company, a corporation of Pennsylvania Application March 24, 1931, Serial No. 524,995

3 Claims. (Cl. 250—41.5)

My invention relates to photo-sensitive apparatus and has particular relation to selective photo-sensitive apparatus.

It is an object of my invention to provide a photo-sensitive device that shall be responsive to a predetermined region of the radiation spectrum.

Another object of my invention is to provide a photo-sensitive device that shall be responsive to a predetermined region of the spectrum of the radiations emanating from a unitary source.

A further object of my invention is to provide differential measuring apparatus for detecting the magnitude of the radiations emanating from a determined source which lie in a predetermined spectral region.

A more specific object of my invention is to provide photo-sensitive apparatus for exploring the "erythema" region of the spectrum.

More concisely stated, it is an object of my invention to provide highly sensitive apparatus for exploring the radiations emanating from a source relative to a predetermined region of the radiation spectrum.

According to my invention, I provide a plurality of photo-sensitive surfaces disposed in individual containers, each container being transparent to a predetermined region of the radiation spectrum. A plurality of collecting elements are associated with the photo-sensitive surfaces and are also disposed within the containers.

The surfaces and collecting elements are connected in an amplifying circuit in such manner that the effect of radiations on the respective surfaces is algebraically added. The containers for the photo-sensitive surfaces are so chosen that the resultant response of the system has a characteristic lying in the the region which it is desired to explore.

In a specific modification of my invention, the photo-sensitive surfaces are connected in a differential circuit, and the resultant characteristic of the system is represented by the difference between the characteristics of the individual photo-sensitive surfaces.

In a further modification of my invention, a single photo-sensitive surface is utilized and is connected in an electrical amplifying circuit capable of responding only to the variations in the state of excitation thereof. An example of such circuits is an alternating-current amplifier. The light from the source to be explored is interrupted by a rotating surface composed of elements transparent to predetermined regions of the radiation spectrum. Since the electrical system, associated with the photo-sensitive surface, responds only to the variations in the state of excitation of the photo-sensitive surface, the characteristic of the output of the system is represented by the difference of the effects produced in the photo-sensitive surface when it is subject to the radiations transmitted through the transformer elements. By choosing transparent elements of suitable properties, any desirable characteristic may be produced.

The "erythema" region of the radiation spectrum lies between the wave lengths of 2800 Angstroms and 3200 Angstroms. I have found that, if caesium oxide coated photo-sensitive surfaces are enclosed in envelopes of Corex D glass and lime glass, respectively, the resultant characteristic of the system lies in the "erythema" region of the spectrum.

Lime glass is well known in the glass art and its principal chemical characteristic is that it has a considerable quantity of calcium oxide and the usual high precentage of silica. A typical sample of this glass has the following composition. $SiO_2$ 69.66%, CaO 5.06%, $Na_2O$ 18.29%, $Mn_3O_4$ 4.83%, $Al_2O_3$ 1.22%, $K_2O$ .27%, PbO a trace.

Corex D glass is a well known type of glass manufactured by the Corning Glass Works. Its principal chemical characteristic is a large percentage of boron oxide. A typical sample has the following composition. $SiO_2$ 80.24%, $Fe_2O_3$ .004%, MgO .12%, $Al_2O_3$ 2.07% CaO .29%, $B_2O_3$ 12.6%, $Na_2O$ 4.8%.

As shall be seen hereinafter, the glass in question is to be so chosen that the color response characteristic of the cell has predetermined optical properties.

If the system incorporating the rotating surface is utilized for exploring the radiations from the source relative to its "erythema" region, the elements of the surface should be alternately of Corex D glass and lime glass.

Figure 2:
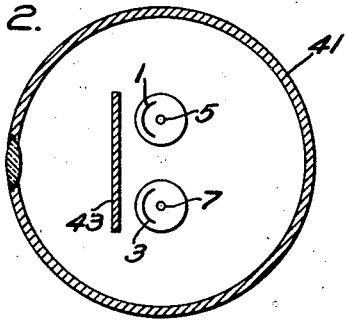
Figure 3:
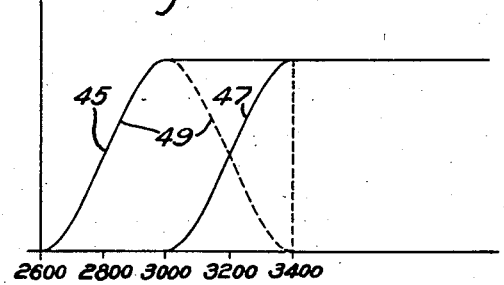
Figure 4:
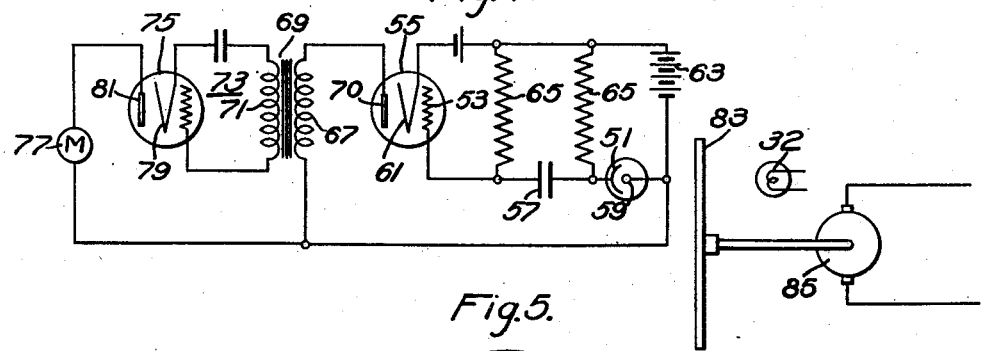
Figure 5:
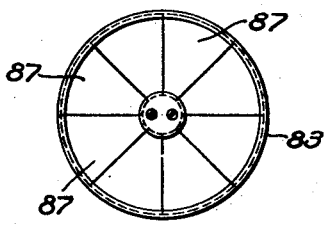

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which:

Figure 1 is a diagrammatic view showing the essential elements of an embodiment of my invention, Fig. 2 is a view, in section, showing a container particularly adapted to the disposition of the photo-sensitive surfaces of apparatus of the type illustrated in Fig. 1, Fig. 3 is a graph showing the frequency characteristics of the individual surfaces of the apparatus illustrated in Fig. 1 and also showing the resultant frequency characteristic of the system, Fig. 4 is a diagrammatic view showing a modification of my invention, and Fig. 5 is a view, in front elevation, showing an element of the apparatus utilized in a system of the type described in Fig. 4.

The apparatus shown in Fig. 1 comprises a plurality of photo-sensitive surfaces 1 and 3 and a plurality of collecting elements 5 and 7 associated with the surfaces 1 and 3. The collecting elements 5 and 7 are connected to the electrical center 9 of an impedance element 11, such as a resistor, for example, through a power source 13, such as a battery. The photo-sensitive surfaces 1 and 3 are connected to the terminals 15 and 17 of the impedance element.

The impedance element 11 is, furthermore, connected between the cathode 19 and the control electrode 21 of a grid-controlled electric-discharge device 23, such as a thermionic valve, for example. A meter 25 or other indicating instrument is connected between the cathode 19 and the anode 27 of the device 23.

Each of the photo-sensitive surfaces 1 and 3 and the associated collecting elements 5 and 7 are enclosed in containers 29 and 31 which are of such transparency that the response of the element 1 or the element 3 disposed therein has a predetermined frequency characteristic. The indicating instrument 25, in the principal circuit of the amplifying device 23, is responsive to the difference in the states of excitation of the photo-sensitive surfaces 1 and 3 and has, consequently, a characteristic represented by the difference in the characteristics of the photo-sensitive surfaces.

In providing the selective photo-sensitive device described hereinabove, I have been confronted with the baffling problem of equally affecting the photo-sensitive surfaces 1 and 3 from a single source of light 32. This problem does not ordinarily arise when parallel radiations are studied but is of considerable importance when radiations from a practical source at different distances are under investigation.

When the concentrated source 32 of radiation is studied, a shield 33, having a slot 35 therein, is disposed between the photo-sensitive surfaces 1 and 3 and the source. The radiations from the source 32 are transmitted through the slot 35 and are reflected by a plurality of mirrors 37 and 39, suitably oriented relative to the photo-sensitive surfaces 1 and 3. It is to be noted that the mirrors 37 and 39 should be so oriented that the bisector of the angle between them is colinear with the optic axis of the beam emanating from the source 32.

In a modification of my invention, I have provided for the equal illumination of the two photo-sensitive surfaces 1 and 3 by disposing the surfaces in a spherical container 41, the internal surface of which is coated with a diffusely reflecting layer. The surfaces 1 and 3 are protected from the direct radiations of the source by a screen 43 disposed between the opening in the sphere and the surfaces. It will be noted that the sphere 41 is similar, in structure, to the corresponding element of spherical photometer.

In Fig. 3, the frequency-response characteristics of the individual elements of a particular system and of the system per se are shown. In the system represented by the graph of Fig. 3, the photo-sensitive surfaces 1 and 3 are of the caesium oxide type disposed in suitably selected containers 29 and 31 of Corex D glass (i. e., borosilicate) and lime glass, respectively. As shown in the view, the frequency-characteristic curve 45 for the Corex D container extends from 2600 Angstroms and has a saturation point at approximately 2850 Angstroms. The frequency-characteristic curve 47 of the lime glass container starts at 3000 Angstroms and attains a saturation value at 3400 Angstroms. The resultant frequency characteristic of the system represented by the difference of the characteristics of the two elements is shown by the partly broken and partly full-line curve 49. The full-line section of the curve 49 is so represented because it is identical with the rising section of the characteristic curve 45 of the Corex D glass container.

The apparatus shown in Fig. 4 comprises a photo-sensitive surface 51 connected to the control electrode 53 of an electric-discharge device 55 through a capacitor 57 and a collecting element 59, associated with the surface 51, connected to the cathode 61 of the device 55 through a power source 63. A plurality of suitable grid resistors 65 are associated with the electric-discharge device 55 and are connected between the cathode 61 and the control electrode 53 thereof.

The primary winding 67 of a transformer 69 is supplied by the current passing between the cathode 61 and the anode 70 of the electric-discharge device 55. The current induced in the secondary winding 71 of the transformer 69, feeding into the control circuit 73 of a second electric-discharge device 75, is proportionate only to the variations in the state of excitation of the photo-sensitive surface 51.

An indicating instrument 77 is connected between the cathode 79 and the anode 81 of the second electric-discharge device 75 and gives an indication in proportion to the varying component of the current emitted by the photo-sensitive surface 51.

A disk 83, to be rotated from a motor 85, is disposed adjacent to the surface 51 and is adapted to vary the condition of the radiations impinging on that surface. The disk 83 is composed of alternate segments 87 of elements transparent to a predetermined region of the spectrum. If the "erythema" region of the spectrum is explored by apparatus of this type, the disk 83 is composed of alternate surfaces 87 of Corex D glass and of lime glass, respectively.

The apparatus of the type described in Fig. 4 has the specific advantage that only a single photo-sensitive surface is utilized and, consequently, the problem of equal illumination of the photo-sensitve surfaces from a concentrated source 32 is not encountered.

A number of modifications of the apparatus illustrated and described will be apparent to one skilled in the art. For example, the amplifying system, as illustrated in Figs. 1 or 4, need not necessarily be of the type shown. Amplifiers of other types are well known in the art, and systems incorporating such amplifiers are to be regarded as equivalents within the scope of my invention.

Moreover, while only two photo-sensitive surfaces are illustrated in Fig. 1 of the drawing, my invention is equally well adapted to the exploration of the radiations which would arise from the combination of more than two photo-sensitive sources. In such case, of course, the requisite amplifying device must be supplied.

Finally, it should be noted that other types of transparent surfaces than the disk of the type illustrated in Fig. 5 may be utilized with apparatus of the type illustrated in Fig. 4. Photo-sensitive elements having cylindrical surfaces are well known in the art. With such photo-sensitive elements, a hollow cylindrical surface to be rotated may be utilized.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A selective photo-sensitive device comprising a plurality of photo-sensitive surfaces, a charge-collecting element associated with each surface, said surfaces and elements being connected in a differential circuit, and a plurality of containers for said surfaces and elements, said containers being transparent to radiations of such wave-lengths that the difference between their radiation frequency characteristics lies in a predetermined region of the spectrum.

2. A selective photo-sensitive device comprising a plurality of photo-sensitive surfaces, a charge collecting element associated with each surface, said surfaces and elements being connected in a differential circuit and a plurality of containers for said surfaces and elements, the container for one surface and collecting element being opaque to substantially all radiations of wave length less than a predetermined minimum wave length and having uniform transparency to substantially all radiations of wave length greater than a predetermined maximum wave length and the container for another surface and collecting element being opaque to substantially all radiations of a wave length less than a predetermined minimum wave length, said last-named minimum wave length being greater than said first-named minimum wave length, and having uniform transparency substantially equal to the transparency of said first-named container to substantially all radiations of wave length greater than a predetermined maximum wave length.

3. A selective photo-sensitive device for exploring the "erythema" region of the spectrum comprising a plurality of photo-sensitive surfaces, a charge collecting element associated with each surface, said surfaces and elements being connected in a differential circuit, and a plurality of containers for said surfaces and elements, the container for one surface and element being opaque to substantially all radiations of wave length less than approximately 2600 Angstroms and having uniform transparency to substantially all radiations of wave length greater than approximately 3000 Angstroms and the container for another surface and collecting element being opaque to substantially all radiations of wave length less than approximately 3000 Angstroms and having a uniform transparency substantially equal to the transparency of said first-named container to substantially all radiations of wave length greater than approximately 3400 Angstroms.

EARL D. WILSON.